United States Patent [19]

Mitchell

[11] 4,351,127
[45] Sep. 28, 1982

[54] OCEAN BOTTOM SAMPLER

[76] Inventor: Charles T. Mitchell, 10771 Morada Dr., Orange, Calif. 92669

[21] Appl. No.: 197,624

[22] Filed: Oct. 16, 1980

Related U.S. Application Data

[63] Continuation of Ser. No. 958,788, Nov. 8, 1978, abandoned.

[51] Int. Cl.³ ............................................. A01K 73/02
[52] U.S. Cl. ............................................. 43/9; 43/104
[58] Field of Search ...................................... 43/9, 104

[56] References Cited

U.S. PATENT DOCUMENTS

| | | | |
|---|---|---|---|
| 314,047 | 3/1885 | Moscopoulos | 43/9 |
| 436,541 | 9/1890 | O'Connor | |
| 1,959,793 | 5/1934 | Lafredo et al. | 43/9 |
| 2,523,925 | 9/1950 | Sorensen | 43/9 |
| 3,023,529 | 3/1962 | Luketa | 43/9 |
| 3,458,947 | 8/1969 | Ross | 43/9 |
| 3,548,531 | 12/1970 | Holden | 43/9 |
| 3,561,150 | 2/1971 | Silchenstedt | 43/9 |
| 3,782,020 | 1/1974 | Puckett | 43/9 |

FOREIGN PATENT DOCUMENTS

| | | | |
|---|---|---|---|
| 683093 | 3/1964 | Canada | 43/9 |
| 963911 | 5/1957 | Fed. Rep. of Germany . | |
| 573358 | 2/1958 | Italy | 43/9 |
| 6713353 | 4/1969 | Netherlands | 43/9 |
| 21965 | of 1899 | United Kingdom . | |
| 356081 | 1/1931 | United Kingdom . | |
| 1064626 | 4/1967 | United Kingdom | 43/9 |

Primary Examiner—Jimmy C. Peters
Assistant Examiner—J. T. Zatarga
Attorney, Agent, or Firm—Knobbe, Martens, Olson, Hubbard & Bear

[57] ABSTRACT

A sampling device for measuring the quantity and distribution of young fish life very close to the ocean floor, having a pair of large wheels and a set of small rollers to enable the sampler to traverse rough ocean bottom terrain.

12 Claims, 9 Drawing Figures

OCEAN BOTTOM SAMPLER

This application is a continuation, of application Ser. No. 958,788, filed Nov. 8, 1978 now abandoned.

BACKGROUND OF THE INVENTION

The present invention relates to an ocean bottom sampling device, and more particularly, to a device having two sets of wheels which allow it to travel over rough terrain while still maintaining the sampler's net opening near the ocean floor.

In both environmental impact studies and marine biological research programs, it is very often necessary to determine the abundance and distribution of fish life at various depths along the water column of the ocean. Typically, this information is obtained by passing a net through a known volume of water and then counting the number of fish trapped within the net. The net and the device to which it is attached is often called a "sampler". The volume of water sampled is ordinarily determined by multiplying the cross-sectional area of the net opening by the distance through which the net has been passed. The present invention focuses on the problem of measuring fish life which inhabits the water very close to the ocean floor.

In the past, this problem has been primarily approached through the use of sled-like samplers. These sleds typically had elongate, rigid bodies which were essentially rectangular in shape, and had a conical-shaped net attached at the rear. A tow rope was attached to the sled enabling it to be dragged along the ocean bottom behind a boat. The primary advantage of using these sleds to sample the ocean bottom was that the rigidity of their bodies ensured that the net opening would always remain perpendicular to the ocean floor. Thus, the cross-sectional area of the net opening was a constant, thus making accurate water volume measurements possible.

However, there were several disadvantages to the use of these sleds. First, the framework of the sled and the attached tow rope often obstructed the opening of the net, thereby causing many fish to avoid entering the net and resulting in inaccurate measurements. This was especially true with respect to larval and juvenile fishes, the abundance and distribution of which are of particular importance in environmental impact studies.

Secondly, the sleds often became snagged or damaged by contact with rocks or other obstructions on the ocean floor. This problem often resulted in inaccurate samples, or required that the measurements be repeated. Also, the sleds often had to be repaired or replaced.

Thirdly, and most significantly, because of the long rigid nature of the prior art sleds, they did not perform well in hilly terrain. That is, the sleds would often pass from peak-to-peak without sampling the fish found in the valleys. As mentioned above, it is very important to sample fish life very close to the bottom, for example, within 5 or 6 inches of the ocean floor. Thus, the failure of these prior art sleds to sample the fish in the valleys between peaks led to inaccurate measurements.

The ocean bottom sampler of the present invention solves the problems presented by the prior art by the novel use of a wheeled sampler. The present invention also maintains the net opening in a vertical position and close to the ocean floor.

SUMMARY OF THE INVENTION

The present invention makes novel use of two sets of wheels to form an ocean bottom sampler which is able to traverse rough, ocean bottom terrain while at the same time maintaining the net opening perpendicular and close to the ocean floor.

The sampler of the present invention consists of a body with large wheels attached to either side, and a series of small rollers attached along the bottom. The opening of a collector net is attached to a net frame which is mounted on the body just above the rollers.

The sampler is able to avoid collisions with and snags upon rocks on the ocean floor because of its large wheels. That is, the wheels have large radii which allow them to more easily traverse such obstructions on the ocean floor without becoming snagged upon them. Furthermore, the rollers allow the sampler to travel over smaller obstructions which may come between the large wheels.

The wheels of the sampler also make it possible to traverse hilly terrain and to sample the fish in the valleys between peaks. Simultaneously, since the vertical plane of the net opening lies just above the rollers, their small diameter allows the net opening to be maintained close to the ocean floor. Thus, accurate measurements can be obtained under both rocky and hilly conditions.

Significantly, the sampler of the present invention is able to maintain the net opening, perpendicular to the ocean floor, and at a uniform distance from the ocean floor, throughout the sampling operation. This important feature is accomplished through the combination of three independent factors. First, the rollers are offset towards the rear of the axis of the large wheels. That is, the point of contact of the rollers with the ocean floor is behind that of the large wheels. This wheel arrangement provides for inherent stability of the sampler. For example, if there were no rollers, or if the axis of the rollers was in the same vertical plane as the axis of the large wheels, the net opening would not remain vertical but would tend to rotate. Such rotation would probably be due to non-uniform tension on the tow rope and ocean currents. With the rollers set behind the wheels, the sampler is less likely to tip in one direction or the other.

On the other hand, if the rollers were set back further from the axis of the large wheels, the stability of the sampler would be even greater. However, its ability to travel over hilly terrain would be decreased because, like the sleds of the prior art, the sampler's body would be longer and would tend to travel from peak-to-peak rather than passing down into the valleys to sample the fish therein.

A second factor enabling the sampler of the present invention to maintain the net opening in a vertical position is the concentration of the body weight above the rollers. As mentioned above, the vertical plane of the net opening is located just above the rollers, and the approximate center of gravity of the sampler body, including the frame for the net opening, is also located there. Even though the rollers are set back behind the large wheels, tow rope tension and ocean currents could still cause the sampler body to tip forward or rotate about the axis of the large wheels. The concentration of the body weight above the rollers, however, counteracts this rotational tendency, thus providing the sampler with stability and preventing the rotation of the net opening from its vertical position.

Finally, the third factor contributing to the stability of the sampler is a stabilizer mounted on the upper portion of the sampler body. The effect of this stabilizer is similar to that of the concentration of weight on the rollers. That is, in operation, the stabilizer tends to counteract the tendency of the sampler body to rotate about the axis of the wheels.

Thus, the principal advantages of the ocean bottom sampler of the present invention are that it is able to avoid collision with and snags upon large obstructions on the ocean floor, such as rocks or boulders, and to obtain accurate samples of fish life along the ocean floor even in hilly terrain. At the same time, the sampler of the present invention achieves the important objectives of maintaining the net opening close to the ocean floor and, for accurate water volume measurements, in a vertical position.

A further advantage of the present invention is that it eliminates all obstructions to the net opening. For example, the location of the large wheels on either side of the sampler body present no obstruction problem. Similarly, the small rollers are located beneath the net opening and do not prevent fish from entering the collector net. Also, the tow rope can be attached to the body above the net opening and thus does not act as an obstruction.

A further advantage of the present invention is that the net frame is removable. This feature aids in the handling of the net and also allows for accurate measurements in that the net-net frame combination can be easily removed, the net carefully washed down, and the fish found within counted.

A significant advantage of the preent invention is that the net frame can assume variable positions depending upon the phase of the operation. To avoid contamination of the sample with organisms other than those occurring at or near the sea floor, the device must remain closed during descent and ascent. Therefore, during the descent of the sampler to the ocean bottom, the net opening is in a horizontal or closed position so as to prevent the entrance of water into the net. Of course, during the sampling operation, it is necessary that the net opening be maintained in a vertical position. But following the sampling phase, during ascension of the sampler to the surface, it is again desirable to turn the net opening to a horizontal position. The advantage here again is to expedite the raising of the sampler to the surface. The position of the net frame of the present invention can be advantageously varied through the use of two tripping mechanisms.

Finally, the sampler of the present invention utilizes a unique and novel net. Because the sampling takes place on the ocean floor, collector nets have traditionally suffered damage due to their contact with various objects thereon. The net of the present invention utilizes floats on its upper portion and overlapping flaps on its underside to protect the net from such destruction.

These and other advantages of the present invention are readily apparent by reference to the drawings in which.

DETAILED DESCRIPTION OF THE PREFERRED EMBODIMENT

Introduction

The present invention is an ocean bottom sampler for use in measuring the quantity and distribution of fish life very close to the ocean floor. The purpose of the sampler of the present invention is to maintain a net opening of known area in a vertical position while traveling along the ocean floor for a predetermined distance. The collector net of the sampler can then be removed and washed down, and the number of fish trapped therein can be measured. The primary advantage of the present invention is that accurate measurements of this type can be obtained even in rough and hilly ocean terrain.

Figure 1:
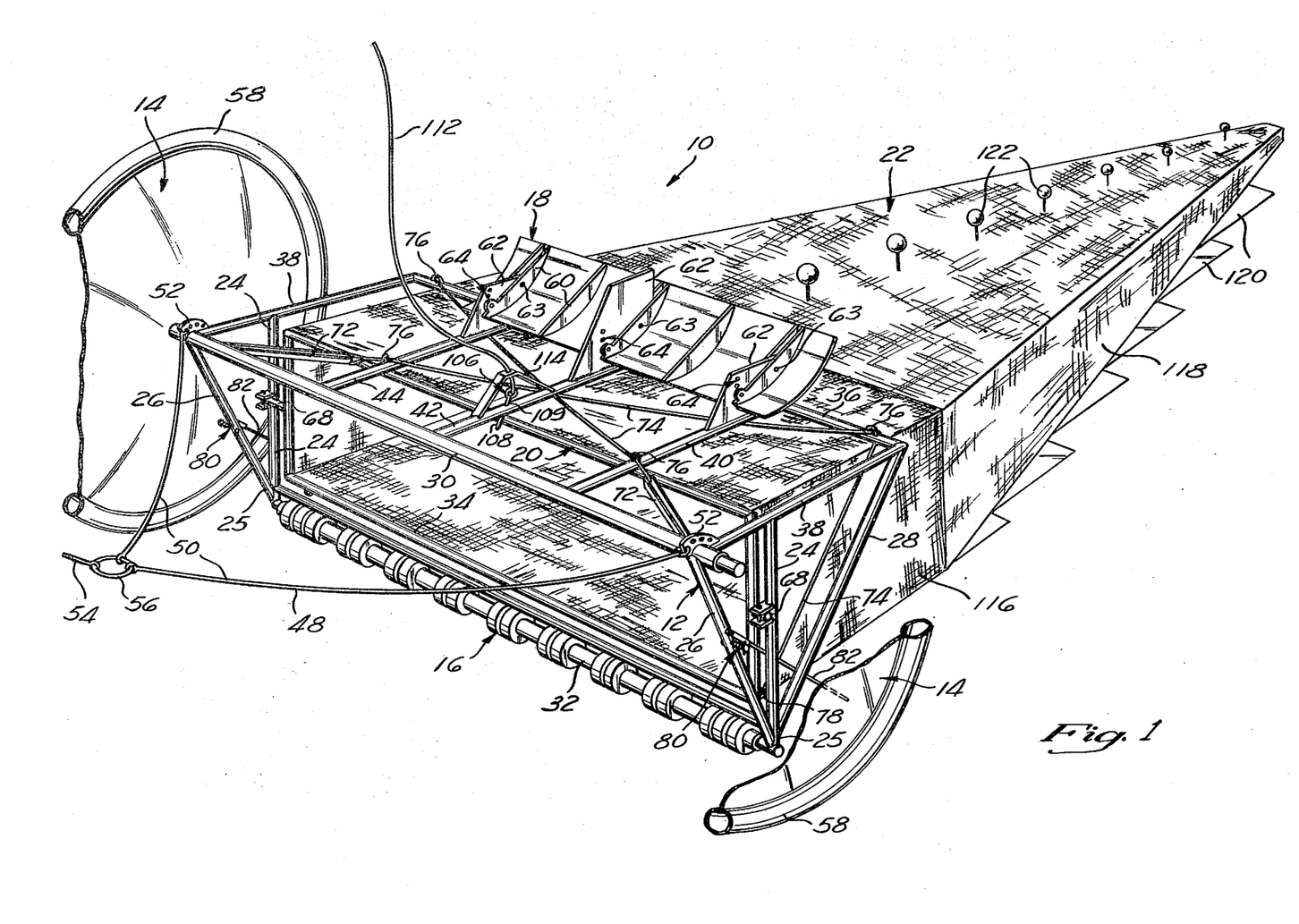
FIG. 1 is a perspective view of the present invention with the large wheel nearest the viewer cut away so as to disclose the detailed design of the sampler body, net frame, and net attachment.

Referring first to FIG. 1, it can be seen that the ocean bottom sampler of the present invention, indicated generally at 10, consists of the following major components: a sampler body 12, two large wheels 14, attached to either side of said body, rollers 16 attached along the bottom of the body, a stabilizer 18, mounted on the top of said body, a net frame 20 for the attachment of a collector net and a collector net 22.

BODY

Figure 3:
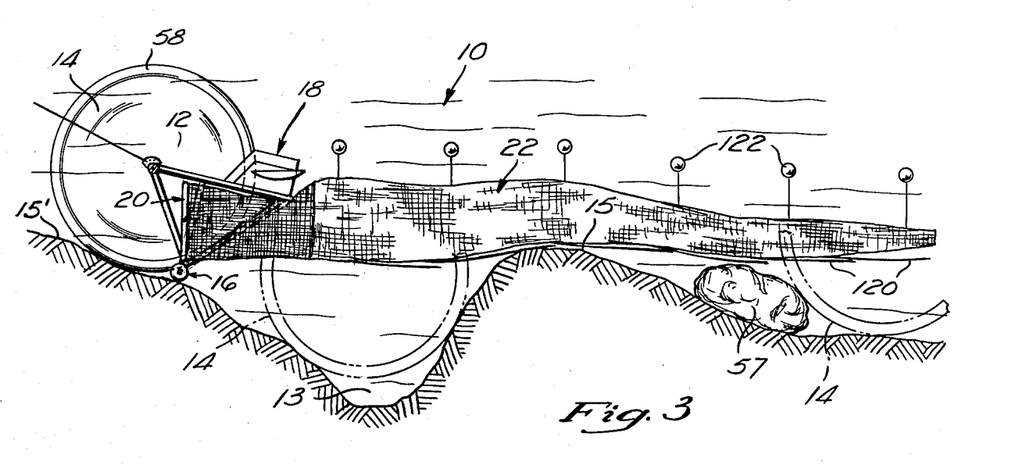
FIG. 3 is a side view of the sampler of the present invention depicting its samplinng capabilities in rough, hilly ocean bottom terrain.
Figures 4, 5, 6:
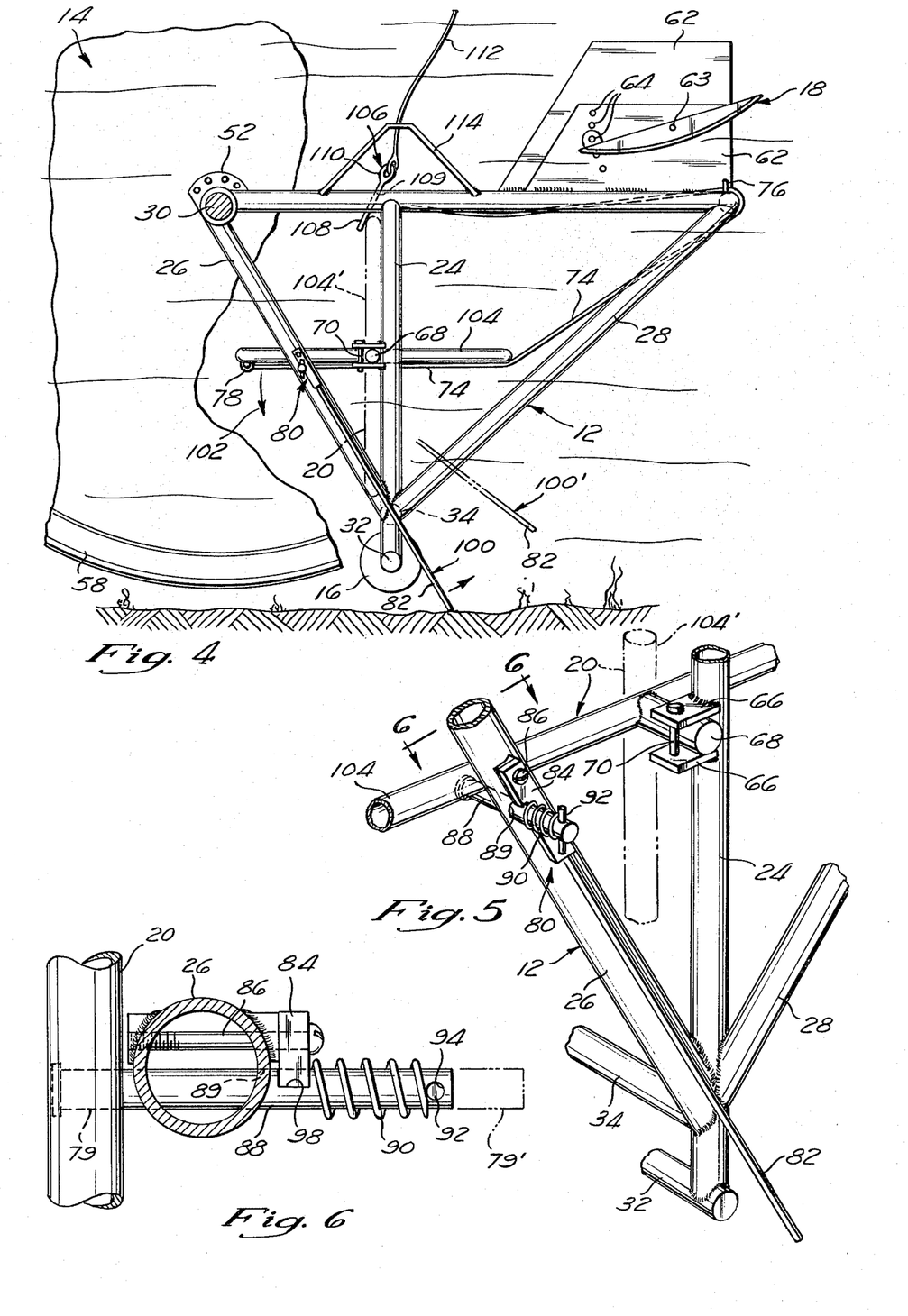
FIG. 4 is a partial side view depicting the descent tripping mechanism which allows the net frame to rotate from its horizontal-descent position to a vertical-sampling position, and also shows the ascent tripping mechanism which allows the net frame to rotate from the vertical position to a horizontal-ascent position.
FIG. 5 is a detailed perspective view of the descent tripping mechanism, showing the elongate trigger arm and the spring-loaded locking device.
FIG. 6 is a cross-sectional view taken along lines 6—6 of FIG. 5 illustrating the spring-loaded locking device used in conjunction with the descent tripping mechanism.

The purpose of the body of the sampler is to provide a frame or chassis for the attachment of the other major components of the present invention. The body 12 is essentially triangular in shape as seen from one side (FIG. 4). This configuration provides for a sturdy and strong structure, and yet enhances the efficiency of the invention. For example, the compact body of the sampler allows it to traverse hilly ocean bottom terrain, as shown in FIG. 3, and to sample fish in the valley 13 between peaks 15 and 15'. On the contrary, a longer bodied sampler would tend to merely pass from peak 15 to peak 15'.

Referring to FIG. 1, the body includes a pair of triangular end frames each comprised of a forward strut 26, a rear strut 28, and a horizontal top strut 38 rigidly interconnected at their ends to form a triangle. A vertical strut 24 extends from below the lower apex 25 of the triangle up to a connection with the top strut 38 intermediate its ends. Horizontal members 30, 34, and 36 are connected at the respective apexes of the triangular end frames and extend across the body to interconnect the end frames. A roller axis 32 has its opposite ends connected to the bottom of the respective vertical struts 24 so as to extend across the body and be positioned slightly below the lower horizontal member 34. Longitudinal braces 40, 42, and 44 interconnect the top horizontal members 30 and 36 along their lengths to further rigidify the body.

Attached to the body is tow bridle 48, also shown in FIG. 1, which provides a means for the sampler to be towed along the bottom behind the boat. The bridle consists of bridle ropes 50 which are attached to the upper member 30 of the body by the use of brackets 52. The tow rope 54 is connected to the tow bridle by means of a ring 56.

WHEELS

One large wheel 14 is mounted on each side of the sampler body 12, on the opposite ends of horizontal member 30 which also serves as a wheel axle, as shown in FIG. 1. The wheel nearest to the viewer in FIG. 1 is substantially cut away so as to reveal the detailed structure of the present invention.

The purpose of these large wheels is to allow the sampler of the present invention to travel over obstructions found on the ocean floor, such as large rocks 57, as shown in FIG. 3. The large radius of wheels 14 makes this feature possible. Furthermore, the positioning of the wheels at the sides of the sampler body avoids the problem of obstructing the net opening 22.

Mounted on the perimeter of the wheel (FIG. 1) is a tire 58, which is composed of a plastic material, and is capable of absorbing the shock resulting from collisions of the wheels with rocks, etc.

ROLLERS

Referring again to FIG. 1, rollers 16 can be seen rotatably mounted along the roller axle 32. These rollers allow the sampler 10 to traverse obstructions which occur between the large wheels 14, and in general, allow a smoother ride along the bottom. As previously mentioned, the rollers 16 also give stability to the sampler since they contact the ocean floor at a point behind that at which the large wheels contact the floor. This feature is best illustrated by dimension A, shown in FIG. 2. This dimension A is preferably approximately 15 inches or one-half the radius of the large wheel.

The rollers are advantageously not set back too far from the large wheels, for this would inhibit the sampler's ability to travel into the valleys between hills, as shown in FIG. 3.

Also, enhancing the stability of the sampler 10 is the fact that the weight of the body is concentrated above the rollers, thereby counteracting the tendency of the body 12 to tip or rotate. Stability is an important feature of the present invention because it allows the net opening to remain in a vertical position during the sampling process, thus allowing accurate measurements to be obtained.

Figure 2:
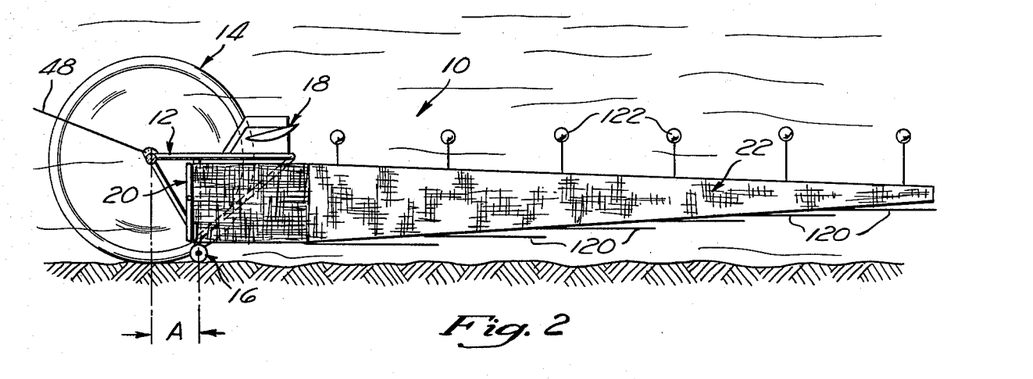
FIG. 2 is a side view of the present invention during the sampling operation along the ocean floor, showing the vertical position of the net opening and its proximity to the ocean floor.

It is also important that the net opening be maintained close to the ocean floor, as shown in FIG. 2, and therefore, the rollers are only 3 or 4 inches in diameter.

STABILIZER

The primary function of the stabilizer 18 is to provide even more stability to the sampler 10. As shown in FIG. 1, the stabilizer is mounted on the body 12 so as to have a downward angle of attack with respect to the direction of travel of the sampler 10. Thus, the stabilizer experiences a downward pressure produced by the action of the water against it, thereby preventing upward rotation of the sampler about the wheel axle 30. Therefore, the stabilizer aids in the important objective of maintaining the net opening in a vertical position during the sampling operation.

In cross-section, the stabilizer is curved in appearance with its concaved surface facing in the direction of travel. The stabilizer is strengthened by rib supports 60, and is attached at the upper rear of the body 12 by means of three vertical fins 62 attached to the longitudinal braces 40, 42, and 44. These fins, best seen in FIG. 4, provide for lateral stability of the sampler, that is, they tend to inhibit movement of the sampler in a direction which is transverse to the direction of travel. The stabilizer 18 is rotatably mounted upon fins 62 on pivot pins 63 and its angle of attack can be adjusted through the use of adjusting pins in the holes 64 in the fins in order to vary the downward pressure it experiences.

NET FRAME

The net frame 20 is rectangular in shape and mounted on sampler body 12 in the enclosure defined by horizontal members 30, 34, and 36, and vertical members 24, as shown in FIG. 1. The purpose of the net frame is to provide a means of attachment for the opening of the collector net 22. The net frame of the present invention is unique in that it can be easily removed with the net 22 still attached. This advantage allows for ease in handling the net upon completion of the sampling operation. Removal of the net frame is accomplished by removing locking pin 70, shown in FIG. 5.

As the sampler is towed along the ocean floor, the main portion of the net trails behind the sampler body, its shape maintained by the pressure of the water passing through it. Therefore, this water pressure produces a drag effect which reduces the velocity with which the sampler can be towed.

During the sampling operation, this drag is a disadvantage which must be tolerated because of the nature of the measurements being obtained. However, there is no need to tolerate such drag in the phases of the operation which involved lowering the sampler to the ocean floor and then raising it again to the surface upon completion of the sampling operation. Furthermore, it is desirous to prevent fish from entering or leaving the net during these phases because of the resultant decrease in the accuracy of the sampling operation. Therefore, it is advantageous to prevent water from entering the net opening, thereby eliminating the drag effect and increasing the accuracy of the sample, during both the descent and ascent phases of the operation.

These objectives can be accomplished by placing the net frame in a horizontal position with the net opening facing the opposite direction of travel during these respective operations.

For example, during descent of the sampler to the bottom, the net frame is maintained in a horizontal position with the net opening facing towards the surface of the water. This positioning of the net opening prevents water and fish from entering the net and producing a drag effect. Similarly, during ascent of the sampler to the surface, the net frame is again placed in a horizontal position, however, the net opening faces the ocean floor. Therefore, an important feature of the present invention is its variable-position net frame 20.

The principal components of the variable position net frame are the rotational mounting of the net frame upon the sampler body, a tension system which provides rotational power to the net frame, and two distinct tripping mechanisms which allow rotation at proper times. Referring first to FIG. 5, it can be seen that the net frame 20 is rotatably mounted on the vertical support members 24 of the sampler body 12 by means of an arm 68 and a bracket 66 at each end. Each arm 68 is held in its place in the hinge by a locking pin 70 which is inserted through the bracket 66.

Rotation is provided to the net frame by means of a tension system, best illustrated in FIG. 1. Elastic bands 72 are attached at opposite ends of the wheel axle 30. Cords 74 are attached to each band and run in a criss-crossing pattern through guides 76 and ultimately attached to net frame 20 at point 78, as shown in FIG. 4. With the net frame 20 in a horizontal position 104, as shown in FIG. 4, elastic bands 76 are placed in tension and transmit a rotational force through cords 74 to the net frame 20. This rotational force is in the direction of arrow 102 (FIG. 4).

The purpose of the tripping mechanisms 80 and 106, is to prevent rotation of the net frame until the appropriate point in time during the sampling operation is reached. Upon being tripped, these mechanisms then allow rotation of the net frame into the sampling or ascent positions, respectively.

The descent tripping mechanism 80 is located on the forward strut 26 on both sides of sampler body 12, as seen in FIG. 1. The purpose of the descent tripping mechanism is to maintain the net frame 20 in a horizontal position 104 during descent of the sampler to the ocean floor. Upon reaching the ocean floor, the tripping mechanism then allows rotation of the net frame into the vertical position 104', as shown in FIGS. 1 and 4.

Referring to FIGS. 5 and 6, it can be seen that net frame 20 is prevented from rotating by pin 88 which is inserted through hole 89 in forward strut 26. Since rotation is in the direction of arrow 102 (FIG. 4), rotation of the net frame is prevented by pin 88 which acts as an obstruction to such rotation, as shown in FIG. 6. Pin 88 is held in place by latch 84 which is inserted into notch 98 in the bolt (FIG. 6). Latch 84 is attached to the top portion of long trigger arm 82 and is mounted on forward strut 26 by means of a screw 86. Referring specifically to FIG. 6, pin 88 is seen in position 79 below net frame 20, thereby preventing rotation of the net frame until it is withdrawn to position 79' (shown in dotted lines). Removal is accomplished by the action of spring 90 which is compressed when the pin is in place below the net frame member. The spring is held in place over the bolt by a peg 92 inserted into hole 94.

The operation of the descent tripping mechanism will now be explained. With the trigger arm 82 in position 100 as seen in FIG. 4 (that is, aligned with forward strut 26), latch 84 mates with notch 98 and 88 is retained in a locking position 79 (FIG. 6) within the net frame. When trigger arm 82 strikes the ocean floor, causing it to rotate upwards into position 100' (FIG. 4), latch 84 disengages notch 98 and the force of spring 90 causes locking pin 88 to withdraw from beneath the net frame into position 79' (FIG. 6), thus allowing the net frame to rotate in the direction of arrow 102 into a vertical position 104', also shown in FIG. 4. The net frame is now in its sampling position, as shown in FIG. 1, and is prevented from further rotation by the action of ascent tripping mechanism 106.

Referring to FIG. 4, the ascent tripping mechanism 106 consists of a pin 108 inserted through a hole 109 in horizontal member 42 of sampler body 12, as shown in FIG. 1. This pin extends down into the path of rotation of the net frame, as shown in FIG. 4, and prevents further rotation. A rope 112 is attached to an eyelet 110 which comprises the upper portion of pin 108. This rope runs through a guide bracket 114 mounted on horizontal member 42 and extends to the surface of the ocean. Tripping is accomplished by manual tension applied to the rope at the surface which removes the pin and allows forward rotation of the net frame to horizontal position 104'', shown in FIG. 9.

In conclusion, it can be seen that the combination of a rotational net frame, an elastic tension system, and tripping mechanisms provides a novel variable-position net frame which enhances the efficiency of the present invention during the descent and ascent phases of the operation.

NET

The purpose of collector net 22, as shown in FIG. 1, is to collect the larval and juvenile fishes found near the ocean floor. Following the sampling operation as described below, the net and net frame combination can be removed from the sampler 10 by removing locking pins 70 (FIG. 5), the net carefully washed down, and the fishes contained within counted.

The front portion 116 of the net 22 consists of a cloth material, such as dacron. The rear portion 118 is a fine mesh fabric which allows filtration of the water without allowing the fish to escape.

To protect the bottom of the net from the rough ocean floor, flaps 120 are provided and attached along one of their edges to the bottom portion of net 22. As shown in FIG. 1, the flaps overlap one another so as to minimize the possibility of snags and hangups while still allowing the filtration of water through the bottom of the net. Similarly, floats 122 are attached along the top of the net so as to counteract the weight of the net and reduce the frictional force of the net along the ocean floor. This feature of the present invention serves not only to increase the velocity with which the sampler 10 can travel, but also to protect the bottonm of the net 22 from damage.

OPERATION

Figure 7:
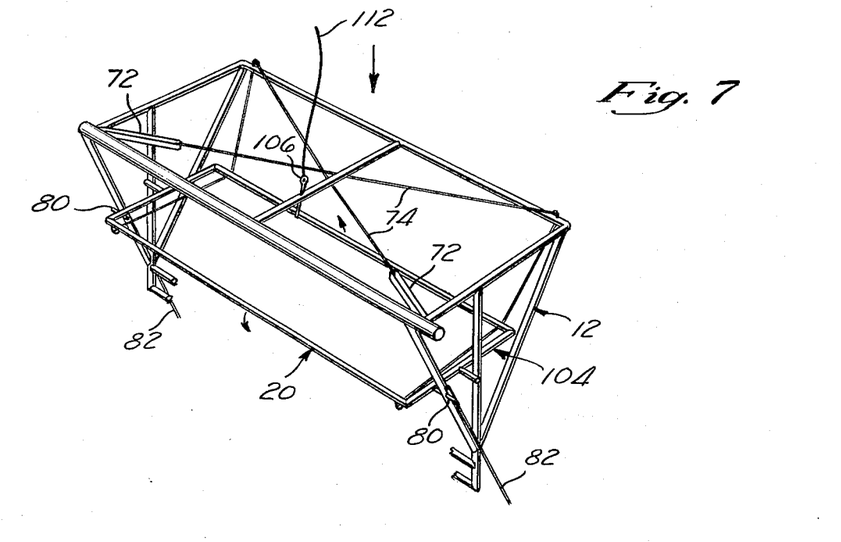
FIG. 7 is a perspective drawing illustrating the horizontal position of the net frame during descent of the sampler to the ocean floor.

In operation, the present invention functions as follows. The net frame 20 is placed in horizontal position 104, as shown in FIG. 7, thus putting elastic bands 72 in tension. As shown in FIG. 5, locking pin 88 is then inserted through hole 89 so as to prevent rotation of the net frame 20 and to retain it in a horizontal position. Bolt 88 is retained in place by the placement of latch 84 into notch 98. The sampler is then lowered to the ocean floor.

Figures 8, 9:
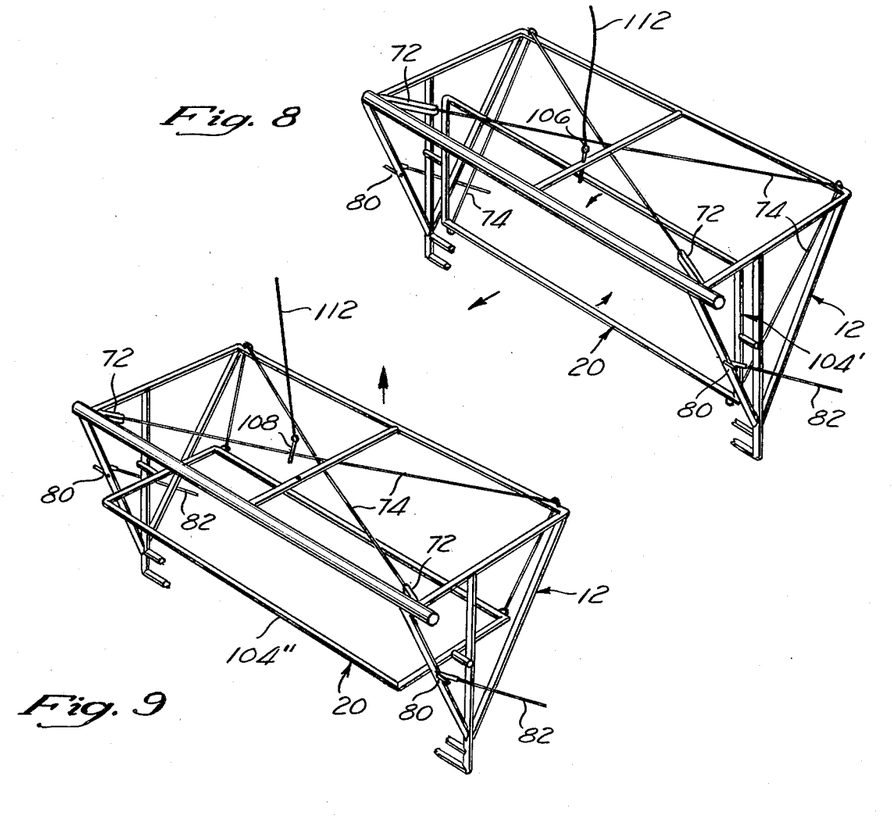
FIG. 8 is a perspective drawing illustrating the vertical position of the net frame during the sampling operation.
FIG. 9 is a perspective drawing illustrating the horizontal position of the net frame during ascent to the ocean surface.

Upon striking the ocean floor, trigger arm 82 rotates to position 100', as shown in FIG. 4, thus releasing springloaded locking bolt 88 and allowing net frame 20 to rotate to the sampling position 104', as shown in FIG. 8. The sampler is then towed behind a boat along the ocean floor by the use of tow rope 54 and tow bridle 48.

Upon completion of the sampling process, ascent tripping mechanism 106 is released by manual tension on rope 112, allowing rotation of net frame 20 into horizontal position 104", as shown in FIG. 9. The sampler can then be quickly raised to the surface, the net frame removed, the net washed out, and the collection measurements obtained.

In conclusion, it should be pointed out that while the specific application of the present invention has been in the sampling of larval and juvenile fish, it can also be used in sampling other fish and other ocean wildlife as well.

I claim:

1. An ocean bottom sampler, comprising:
   a body defining an unobstructed, forwardly facing opening located near the ocean floor;
   a pair of wheels each having a large diameter, one of said wheels attached to either side of said body, said wheels being capable of traveling over rough ocean bottom terrain;
   a plurality of rollers considerably smaller in diameter than said wheels attached along the bottom of said body to provide means for permitting said sampler to traverse obstacles encountered between said wheels;
   a frame for a net opening attached to said body so as to substantially occupy said unobstructed opening, said net frame being mounted on said body for rotation about an axis generally parallel to the axis of said wheels; and
   a net defining an enclosure and having an opening attached to said net frame so that said opening is close to the ocean floor.

2. The ocean bottom sampler of claim 1 further comprising means attached to said body for exerting a downward force on said sampler in order to inhibit movement of said net opening away from the ocean floor during the sampling process.

3. The ocean bottom sampler of claim 1 further comprising:
   means for selectively producing the rotation of said net frame from a position substantially normal to the ocean floor during the sampling along said ocean floor to position substantially parallel to said ocean floor for the ascent of said sampler to the surface.

4. The ocean bottom sampler of claim 1 wherein said net frame is removable from said body.

5. The ocean bottom sampler of claim 1 further comprising means for remotely varying the position of said rotatable net frame.

6. The ocean bottom sampler of claim 1 wherein said net comprises:
   a forward portion defining said net opening and attached to said net frame, said forward portion comprising a cloth-like material;
   a rear portion comprising a fine mesh material;
   a plurality of floats attached to the upper surface of said rear portion to provide buoyancy to said net; and
   overlapping flaps attached along the bottom surface of said net.

7. An ocean bottom sampler comprising:
   a body;
   a pair of large wheels, one each of said wheels attached to either side of said body;
   a plurality of rollers attached to said body along its bottom and rotatable about an axis generally parallel with the width of said body;
   a veriable-position net frame disposed on said body so as to be close to the ocean floor, said net frame being adjustably mounted on said body to provide means for varying the position of said net frame from substantially normal to the ocean bottom during sampling to substantially parallel thereto for ascent to the surface;
   a net attached to said frame; and
   stabilizer means attached to the upper portion of said body for inhibiting movement of said net frame (i) away from said ocean floor, and (ii) away from said substantially normal position during the sampling operation.

8. An ocean bottom sampler, comprising:
   a body;
   a pair of large wheels, one each attached to either side of said body;
   a plurality of rollers attached to said body along its bottom, the axis of said rollers being located to the rear of the axis of the large wheels to provide means for stabilizing said sampler and inhibiting its movement away from the ocean floor, the weight of said body being concentrated on said rollers;
   a net frame disposed on said body so as to be close to the ocean floor; and
   a net attached to said frame.

9. A variable-position net frame for ocean bottom sampling, comprising:
   an outer frame;
   an inner net frame rotatably mounted on said outer frame so as to be rotatable about an axis generally parallel to said ocean bottom, said inner net frame providing for the attachment of a sampling net;
   means biasing said inner net frame for rotation;
   tripping means, comprising:
      a spring-loaded lock device which prevents rotation of said net frame until said spring is tripped; and
      an elongate trigger device which trips said lock device upon making contact with the ocean floor;
   said spring loaded lock device maintains said net frame is a first horizontal position during descent of the outer frame to the ocean bottom; and
   said trigger device releases said lock device upon making contact with the ocean floor, allowing said net frame to rotate to a vertical position.

10. The variable position net frame for ocean bottom sampling of claim 9, further comprising:
    second tripping means, comprising:
       a second lock device; and
       a rope attached to said second lock device which extends to the ocean surface;
    said second lock device maintaining said net frame in a vertical position during the sampling operation; and
    said rope being used to trip said second lock device allowing said net frame to rotate to a second horizontal position 180° from said first horizontal position during ascent of the outer frame to the ocean surface.

11. An ocean bottom sampler, comprising:
    a body defining an unobstructed, forwardly facing opening located close to the ocean floor;

a pair of large wheels, one each of said wheels attached to either side of said body to provide means for traversing rough ocean bottom terrain;

a plurality of rollers rotatively mounted along the bottom of said body on an axis substantially parallel to the axis of said large wheels, the axis of said rollers defining a vertical plane different from that defined by the axis of said large wheels; and a net attached to said body, said net defining an enclosure and having an opening substantially occupying said unobstructed, forwardly facing opening defined by said body.

12. An ocean bottom sampler, comprising:

a body defining an unobstructed, forwardly facing opening located near the ocean floor;

a pair of wheels each having a large diameter, one of said wheels attached to either side of said body, said wheels being capable of travelling over rough ocean bottom terrain;

a frame for a net opening attached to said body so as to substantially occupy said unobstructed opening, said net frame being mounted on said body for rotation about an axis generally parallel to the axis of said wheels;

a net defining an enclosure and having an opening, said opening being attached to said net frame; and means attached to said body for inhibiting the movement of said net opening away from the ocean floor during the sampling process, said inhibiting means exerting a downward force on said body in response to the movement of said sampler along the ocean bottom.

* * * * *